Nov. 22, 1949
G. L. MENDENHALL ET AL
2,488,636
AUTOMATICALLY CONTROLLED AIR CONDITIONER
Filed Feb. 27, 1946
4 Sheets-Sheet 1
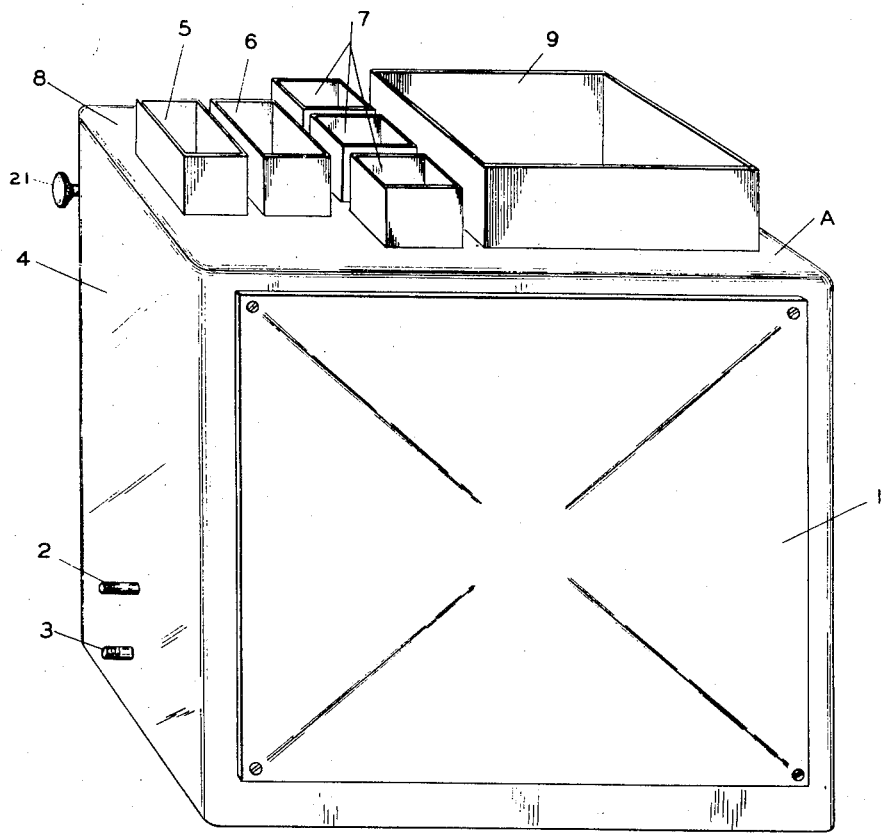
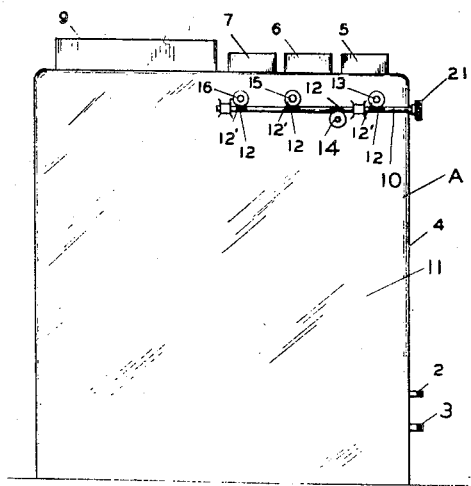
INVENTORS
GEORGE L. MENDENHALL
ADAM C. MOORE
JAMES A. MENDENHALL
Samuel Jacobson
ATTORNEY Nov. 22, 1949   G. L. MENDENHALL ET AL   2,488,636
AUTOMATICALLY CONTROLLED AIR CONDITIONER
Filed Feb. 27, 1946   4 Sheets-Sheet 2

INVENTORS
GEORGE L. MENDENHALL
ADAM C. MOORE
JAMES A. MENDENHALL

Samuel Jacobson
ATTORNEY

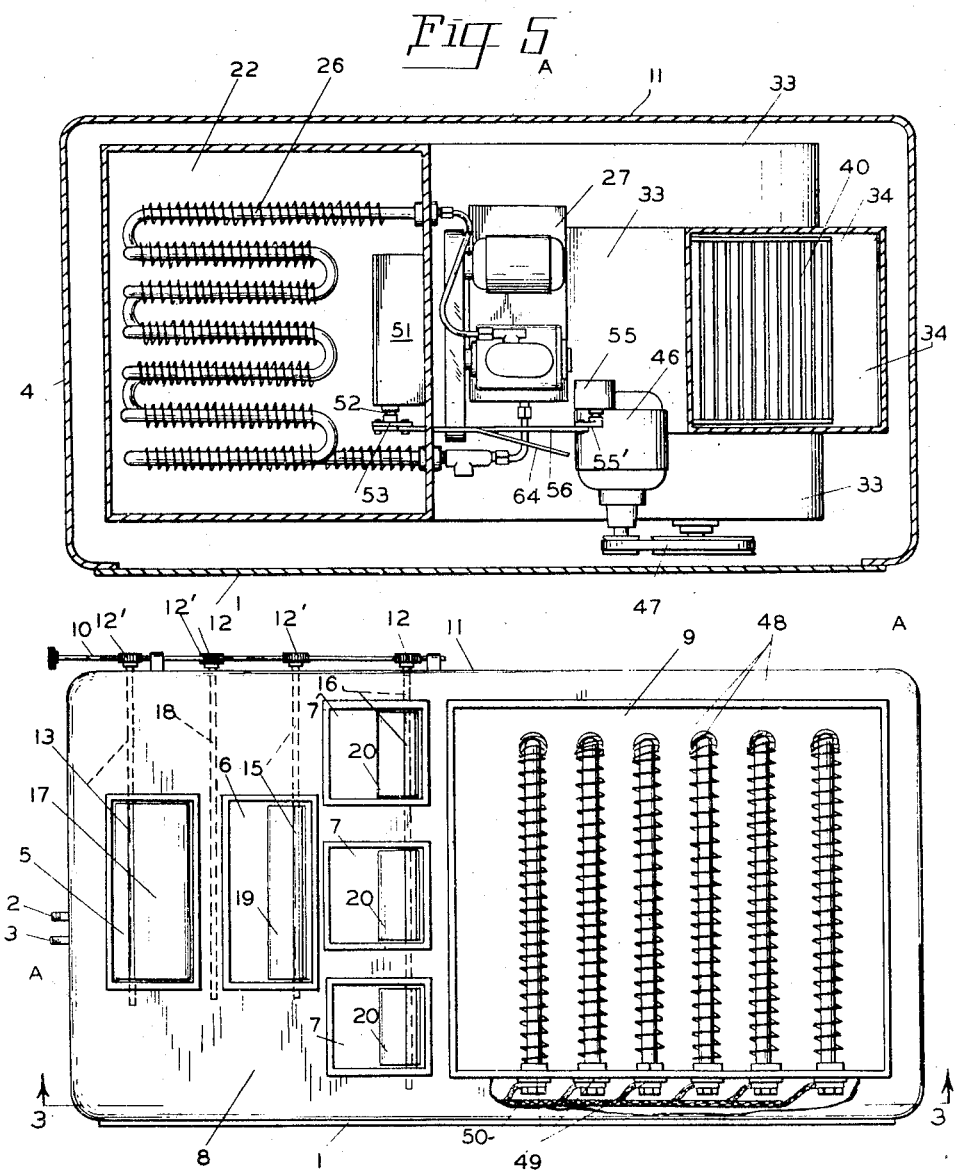

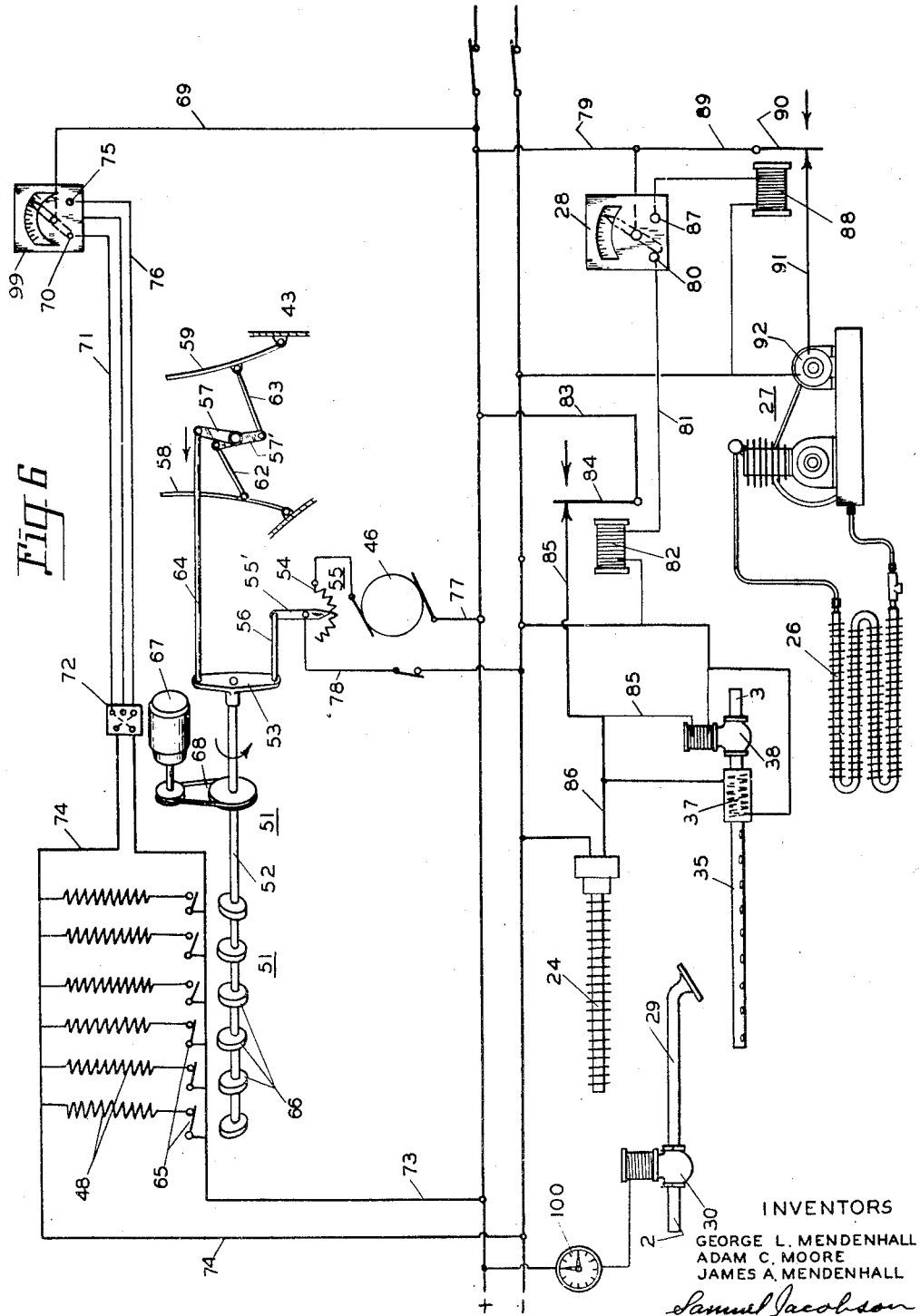

Patented Nov. 22, 1949

2,488,636

UNITED STATES PATENT OFFICE 2,488,636

AUTOMATICALLY CONTROLLED AIR CONDITIONER

George L. Mendenhall and Adam C. Moore, Portland, Oreg., and James A. Mendenhall, Long Beach, Calif.

Application February 27, 1946, Serial No. 650,662

16 Claims. (Cl. 257—3)

Our invention relates broadly to the art of heating, cooling, circulating, humidifying, and, in general, controlling the condition of air supplied to a house or other type of building. More particularly, our invention relates to the improvements in an electrically heated unit whose operation is controlled by thermostatic, hygrostatic and mechanical means interrelated for selective energization in order to maintain predetermined temperatures and humidity within the area desired to be conditioned and thereby provide a correlated system of heating, cooling and otherwise conditioning fresh and recirculated air within a given area.

As a preface to and by way of introduction of the general objects, advantages and features of our invention, and for a clear understanding thereof, it is well to point out the limitations and inherent disadvantages in the present type of heating, cooling and humidifying units. A great majority of heating units now used in homes are hand controlled and must be carefully stoked and operated in order to get even a slight amount of efficiency and in spite of such careful stoking and operating the temperatures and humidity of the air circulated within the area being conditioned cannot be readily controlled with any measure of success.

Present day heating units which have automatic stoking apparatus and which require less operating control still fail to provide adequate temperature and humidity control with any degree of success. All types of present day heating units employed in a home, however efficient they may be, as a result of their careful operation and control, nevertheless produce, as a byproduct, unpleasant and even unhealthful conditions resulting from noxious gases and volatilized smudge. Furthermore these types of heating units require periodic cleaning of either ashes or other fuel residue for the continued safe and efficient operation. Present day installations of air conditioning facilities in homes has been an adjunct to existing heating units and though it results in a material improvement in the conditioning of the air within a given area, the disadvantages heretofore pointed out are not materially eliminated.

The quintessence of our invention is the combination of heating and air conditioning apparatus in which all the basic essentials for providing a flow of air uniformly heated, humidified and filtered to a predetermined state within imperceptible tolerances, are thermostatically, hygrostatically and mechanically controlled and operated under a single system of control.

It is a primary object of our invention to provide a compact, relatively noiseless, attractive in appearance, durable, safe, simple in construction and efficient in operation, dependable in performance and fully correlated and selectively controlled heating, cooling, circulating and humidifying apparatus.

Another object of our invention is to provide a furnace which is electrically heated and which has means therein to control and determine the amount of heat to be generated by the electric elements employed.

Still another object of our invention is to provide for the periodic cleaning of the air filters and means for automatically controlling the flow of the amount of air entering and leaving the furnace.

A further object of our invention is to provide means for deadening the noises created by the motors employed in operation of the furnace and conditioning unit.

Still a further object of our invention is to provide thermostatic, hydrostatic and mechanical controls for energizing the train of devices to control the volume of air circulation, the filtering apparatus, the heating units, the temperature and humidity.

The foregoing objects and such others as may hereinafter be pointed out as the detailed description which follows unfolds itself, may be attained by the illustrated embodiment of our invention as hereinafter described and as shown in the accompanying drawings in which:

Figure 1 is an elevational perspective of the completed unit embodying our invention;

Figure 3 is a sectional elevational view of the interior of the assembled furnace, taken on line 3—3, Figure 4, parts being broken away for convenience of illustration;

Figure 4 is a top, plan view of our invention illustrating the position of the heating elements in relation to the warm air duct and the position of the air intake ducts;

Figure 5 is a sectional, plan view corresponding substantially to the line 5—5 of Figure 3, illustrating the relative positions of some of the elements employed in our invention; and Figure 6 is a diagrammatical layout of the assembled apparatus illustrating schematically the relationship between the various features of our invention.

Figure 2:
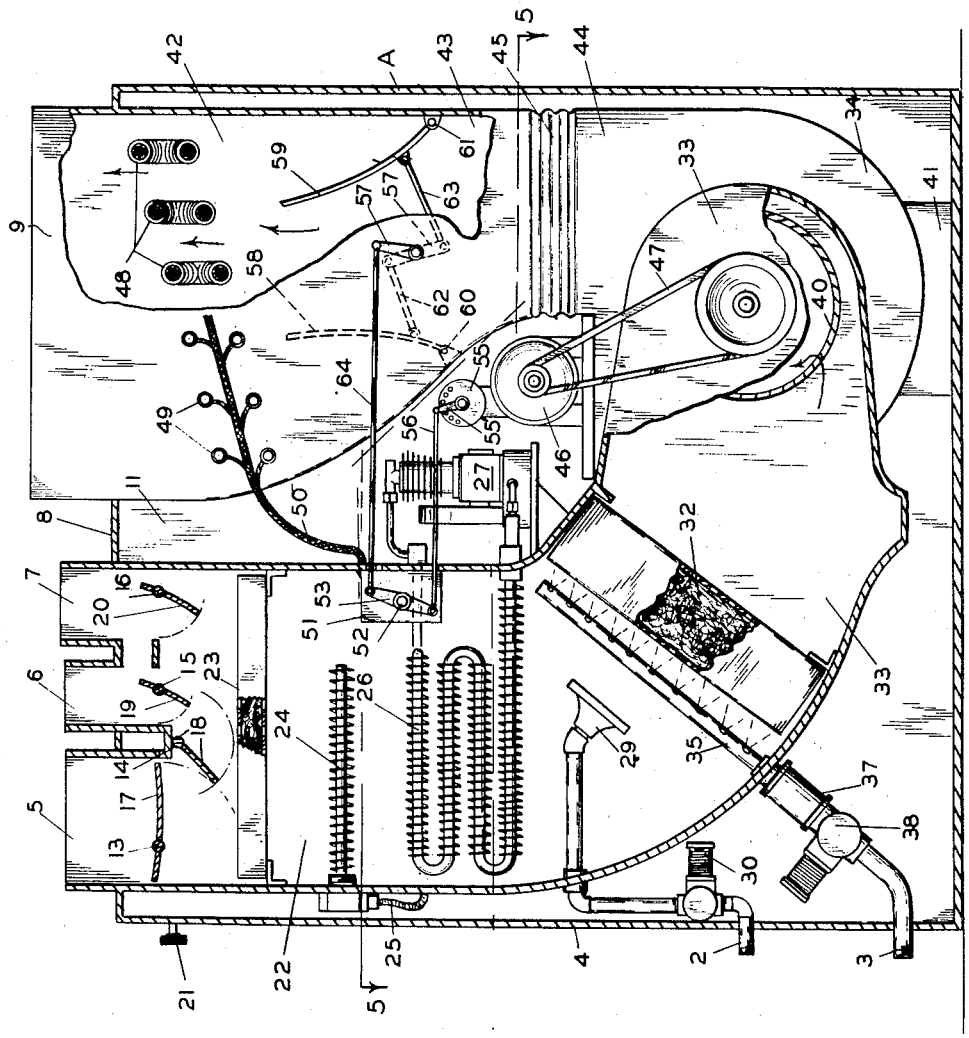
Figure 2 is a rear elevational view of our invention, showing the control mechanism for the dampers placed within the confines of the air-intake ducts.

The furnace and air conditioning unit embodying our invention, when viewed as shown in Figure 1, has an outside casing generally designated by reference character A and possesses the usual rectangular contours with a removable panel 1 forming the front wall. A pair of water pipes 2 and 3 connected to a water source, not shown, extend through side 4 of furnace A. Cold air intake duct 5, attic air intake duct 6 and recirculated heating space air intake ducts 7 extend upwardly from top 8 of the furnace and are joined to ducts leading from the various locations referred to. Conditioned air duct 9 also extends upwardly from the top 8 and ducts, not shown, transfers the conditioned air to the various spaces desired to be heated and air conditioned.

A worm type of control bar 10 is rotatably secured to the rear wall 11 of the furnace within adequate brackets (see Figure 2). Control bar 10 has a plurality of threaded portions 12 formed therein which are aligned and cooperate with threaded wheels 12' secured to the ends of shafts 13, 14, 15 and 16. Referring to Figure 3, dampers 17, 18, 19 and 20 are secured respectively to these shafts and are positioned relative to ducts 5, 6, and 7 so as to restrict and channel the flow of air therethrough when desired. Dampers 17 and 18 are actuated with respect to each other in such a manner as to block off a part of chamber 22 when damper 17 is opened to permit cold air to enter from duct 5 and thus prevent such air to enter into ducts 6 and 7. A manually operated member, such as a wheel 21, is secured to the end of control bar 10 and is used for positioning the various dampers in order to control the amount and type of air to enter into chamber 22 where they are mixed before being processed.

A standard type of air filter 23 is removably positioned within chamber 22 so that the air coming from the several ducts is required to pass therethrough. A plurality of heating elements 24 are also positioned within chamber 22, directly below filter 23 and in line with the flow of the filtered air. A conductor 25 leading to a source of power is secured to these elements in accordance with standard practice. These heating elements give off sufficient heat to slightly warm the air and thus aid in its humidification if necessary and at the same time diminishing the chilliness.

A bank of refrigerating coils 26 are also positioned within chamber 22, directly in line with the flow of the air being drawn into the furnace. These coils receive their refrigerant from a standard type of refrigerating unit 27 adequately secured within the furnace but outside of the line of flow of the air being processed. It is, of course, to be understood that refrigeration is applied only when it is desired to lower the humidity of the air passing thru chamber 22 and when the furnace is used in the summer time for air conditioning purposes only. The operation of the refrigerating unit 27 is automatically controlled by a hygrostat 28 (shown in Figure 6) which is positioned in any desirable manner in the space being conditioned. It is obvious, of course, that the heating elements 24 are not operated when the refrigerating unit is operated.

A shower head 29 is positioned within chamber 22, immediately below the bank of refrigerating coils, and is connected through water pipe 2 to a source of water, not shown. A magnetically operated valve 30 is disposed within the line, the operation of which is controlled by a timeclock 100 (see Figure 6), causing a periodic washing of a second filter 32 of well known construction, which is removably positioned at the bottom of chamber 22 and immediately above the intake 33 of blower mechanism casing 34. This periodic spraying of the filter washes it and prolongs its life. A pipe 35 having a plurality of openings 36 is positioned immediately above filter 32 and is adapted to supply a fine water spray whenever it is desired to raise the humidity of the air before it is subjected to heating. This pipe obtains its water from the water source, not shown, through pipe 3 and has interposed within its line a heating element 37 to preheat the water in the pipe 35. A magnetically operated valve 38 is also positioned in the line and, in correlation with the refrigerating coils, is also controlled by hygrostat 28 except that this spray unit can be used in summer or winter conditions.

A fan rotor 40 of well known construction is securely cushioned on base 41 of the furnace and draws the air through filter 32 and forces it into the interior 42 of heat chamber 43 through discharge neck 44. Heat chamber 43 and neck 44 are joined to each other by a flexible connection 45, which insures against the vibrations caused by the operation of the fan rotor from passing to the heat chamber and to the space being heated. Fan rotor 40 is operated by a prime mover 46 with a standard type belt 47 connecting standard pulleys therebetween.

A plurality of heating elements 48 are securely positioned within the interior 42 of heat chamber 43, directly in line with the air entering the chamber through neck 44. These heating elements are insulated from the chamber by any type of dielectric control material, such as porcelain rings 49. The electric elements are joined to a conductor 50 in parallel. Conductor 50 is connected to modulated control mechanism contained in housing 51 secured below filter 23 in chamber 22. A shaft 52 extends from the modulated control mechanism through housing 51. Crank 53 is keyed to shaft 52 for a purpose which will hereinafter be more particularly explained. A rheostat 55 is mounted adjacent to the prime mover 46 and is adapted to control the speed and actuation of the motor. The arm 55' of the rheostat is joined to one end of arm 53 by the connecting link 56, so that the position of the rheostat, in turn, is controlled by the modulated control mechanism contained in housing 51.

A crank arm 57 is pivotally mounted to the side of the heating chamber 43. A pair of dampers 58 and 59 are pivotally mounted within the interior 42 of heating chamber 43, as shown at 60 and 61 respectively. These dampers are positioned below the heating elements 48 and their operation is controlled by the modulated control mechanism confined in housing 51 by securing these dampers to the crank arm 57' pivotally mounted within the interior 42 and keyed to the same shaft as crank arm 57 by links 62 and 63. Crank arm 57 is itself secured to the remaining end of arm 53 of the modulated control mechanism by link 64.

*Operation*

The foregoing reveals the details of construction and general application of most of the elements and structure which are employed in our invention. We shall now describe the mode of operation of these various elements and structures as an integral heating, cooling, circulating, humidifying and general air conditioning unit. Referring to Figure 6, which is a diagrammatical lay out of the unit just described, the heating elements 48 are controlled in succession by the switches 65. These switches are operated by cams 66 mounted to the shaft 52 contained within and extending from the modulated control mechanism 51. A reversible motor 67, drives a speed reducing unit 68, which in turn drives the shaft 52. The modulated control mechanism 51 not only controls the switches 65 but also controls the speed of the blower 40 and the position of dampers 58 and 59 within the heating chamber 43. We will now describe how this is accomplished.

In the operation of the modulated control mechanism 51, the shaft 52, when initially starting the apparatus, would be rotated in one direction as indicated by the arrow, approximately 90 degrees, and while so rotating within 90 degrees, the cams 66 would close the switches 65 successively until all of the heating units 48 were brought into circuit and energized. When all switches are closed, a unit within the modulating control mechanism 51 (not shown) stops the motor 67. The motor will remain in a stationary condition until the temperature required has reached its level and then will be actuated again to open as many of the switches 65 as may be required to maintain the temperature desired.

We will now describe how the modulated control mechanism is operated relative to the furnace. A thermostat 99 of any standard type supplies electric energy through the conductor 69, contacts 70, conductor 71 into a special reversing switch 72 connected to the motor 67. This will cause the motor 67 to drive the shaft 52 and its cams 66 closing the switches 65 bringing the heating units 48 into operation by supplying energy through the conductors 73 through the switches 65, heating units 48 back to the negative side of the line 74. When the heating units 48 are all brought into circuit, the unit which is in the mechanism 51, but not shown because of common practice, stops the motor 67 and holds the switches 65 closed until the temperature of the rooms are brought up to the desired temperature at which time the thermostat 99 will make contact with the contact point 75, which will deliver energy through the conductor 76 into the reversing switch 72 thereby reversing the motor 67 and the shaft 52, together with the cams 66, opening the switches 65 successively until the desired number of heating elements 48 are cut out of circuit and the room temperature causes the thermostat to take a neutral position stopping the motor 67 at this point. When the room temperature drops the thermostat 99 repeats the operation and brings back into circuit as many of the heating elements 48 as are needed to reach the temperature desired.

The amount of air passing through the heating elements is made to coincide with the amount of heat being developed by them. This is accomplished in the following manner: referring to the diagram, when the shaft 52 is rotated in the direction of the arrows, the heating elements will be aided in their operation by opening the dampers 58 and 59 wider and allowing more air to flow past the elements. This is accomplished by connecting rod 64 being moved by the crank 53, and which in turn moves the rocker arm 57 in the direction of the arrow and thus opening the dampers 58 and 59 and allowing more air to pass through the heat chamber 43 from the blower 40. It is also desirable to increase the speed of the blower 40 under these conditions. This is accomplished by the actuation of the rheostat 54 as the crank 53 travels in the direction of the arrow thus moving the connecting link 56 so as to decrease the resistor 54 of the rheostat permitting a greater flow of energy through the motor 46 by way of the conductor 77, rheostat 54 and back to the negative side of the line by the conductor 78. It can be readily seen that when the dampers 58 and 59 have been opened wider, the volume of air from the blower 40 will be increased to meet the additional heat being developed within the interior of heating chamber 44. When the heating elements are being cut out of circuit the reverse operation takes place relative to the dampers and the amount of air being delivered by the blower.

We will now describe how the humidity of the air is increased within the air chamber 22 when the air space being conditioned requires it. Preheating elements 24 are brought into electric circuit by a hygrostat 28 positioned within the air space being heated and conditioned. When the humidity is lowered, the hygrostat completes an electric circuit through the conductor 79 and the contact 80 through the conductor 81, relay switch 82 and back to the negative side of the line. Electric energy will then flow through the conductor 83, relay switch bar 84, conductor 85, magnetic valve 38, heating element 37 and through the conductor 86 to the preheating elements 24. Water will then be delivered through the valve 38 from a source of supply not here shown into the air chamber 22. When the preheating elements 24 are brought into operation in combination with the warm water delivered by the sprinkler 35 humidity will be added to the air stream. In the event that it is desired to remove humidity from the air the hygrostat 28 will connect the conductor 79 with the contact 87, relay 88 and back to the negative side of the line. Electric energy will then flow through the conductor 89, switch bar 90, conductor 91 and motor 92 of the refrigerating unit 27 delivering refrigerant into the bank of coils 26. This is all that is desired and necessary to lower the humidity.

We have found that periodically the filter units 32 should be thoroughly cleansed with water. This is accomplished by the spray device 29, whose magnetic valve 30 is controlled by a time clock 100 illustrated diagrammatically in Figure 6.

We do not wish to be limited to the exact mechanical details illustrated and described herein as other mechanical equivalents undoubtedly may be substituted for those shown, without departing from the broad spirit of our invention as defined in the appended claims and upon which we desire to secure Letters Patent.

We claim:

1. Apparatus of the class described, in combination, a casing, a chamber positioned within and spaced from said casing, said chamber being formed to receive unprocessed air from a number of sources and to exhaust processed air to a number of locations, means positioned within said chamber for channeling the flow of the unprocessed air into said chamber, means positioned within said chamber below said first mentioned means for preheating said air when desired, means positioned within said chamber below the preheating means for cooling said air when desired, means positioned within said chamber below the cooling means for humidifying said air when desired, means positioned within said chamber for filtering said air at all times, a fan rotor assembly positioned within said chamber for drawing said air into said chamber past and through the foregoing means and exhausting said processed air from said chamber, means positioned within said chamber and above said fan rotor for channeling the flow of said processed air, a plurality of heating elements positioned within said chamber and above said last mentioned means in direct alignment with the flow of air being forced from said fan rotor, temperature responsive means connected to the plurality of heating elements for controlling their operation, moisture responsive means connected to the preheating means, cooling means and humidifying means for controlling their operation, and means for interdependently controlling the actuation and speed of the fan rotor, the position of the means for controlling the channeling of the processed air beyond the fan rotor and the energization of the heating elements.

2. Apparatus of the class described, in combination, a casing, a chamber positioned within and spaced from said casing, said chamber being formed to receive unprocessed air from a number of sources and to exhaust processed air to a number of locations, means positioned within said chamber for channeling the flow of the unprocessed air into said chamber, means positioned within said chamber below said first mentioned means for preheating said air when desired, means positioned within said chamber below the preheating means for cooling said air when desired, means positioned within said chamber below the cooling means for humidifying said air when desired, means positioned within said chamber for filtering said air at all times, a fan rotor assembly positioned within said chamber for drawing said air into said chamber past and through the foregoing means and exhausting said processed air from said chamber, means positioned within said chamber and above said fan rotor for channeling the flow of said processed air, a plurality of heating elements positioned within said chamber and above said last mentioned means in direct alignment with the flow of air being forced from said fan rotor, temperature responsive means connected to the plurality of heating elements for controlling their operation, and moisture responsive means connected to the preheating means, cooling means and humidifying means for controlling their operation.

3. Apparatus of the class described, in combination, a casing, a chamber positioned within and spaced from said casing, said chamber being formed to receive unprocessed air from a number of sources and to exhaust processed air to a number of locations, means positioned within said chamber for preheating said air when desired, means positioned within said chamber below the preheating means for cooling said air when desired, means positioned within said chamber below the cooling means for humidifying said air when desired, means positioned within said chamber for filtering said air at all times, a fan rotor assembly positioned within said chamber for drawing said air into said chamber past and through the foregoing means and exhausting said processed air through said foregoing means from said chamber, means positioned within said chamber and above said fan rotor for channeling the flow of said processed air, a plurality of heating elements positioned within said chamber and above said last mentioned means in direct alignment with the flow of air being forced from said fan rotor, temperature responsive means connected to the plurality of heating elements for controlling their operation, moisture responsive means connected to the preheating means, cooling means and humidifying means for controlling their operation and means for interdependently controlling the actuation and speed of the fan rotor, the position of the means for controlling the air flow and direction of travel of the air beyond the fan rotor and the energization of the heating elements.

4. Apparatus of the class described, in combination, a casing, a chamber positioned within and spaced from said casing, said chamber being formed to receive unprocessed air from a number of sources and to exhaust processed air to a number of locations, means positioned within said chamber for preheating said air, means positioned within said chamber below the preheating means for cooling said air, means positioned within said chamber below the cooling means for humidifying said air, means positioned within said chamber for filtering said air, a fan rotor assembly positioned within said chamber for drawing said air into said chamber past and through the foregoing means and exhausting said processed air from said chamber, means positioned within said chamber and above said fan rotor for channeling the flow of said processed air, a plurality of heating elements positioned within said chamber and above said last mentioned means in direct alignment with the flow of air being forced from said fan rotor, temperature responsive means connected to the plurality of heating elements for controlling their operation, and moisture responsive means connected to the preheating means, cooling means, and humidifying means for controlling their operation.

5. Apparatus of the class described, in combination, a casing, a chamber positioned within and spaced from said casing, said chamber being formed to receive unprocessed air from a number of sources and to exhaust processed air to a number of locations, means positioned within said chamber for preheating said air, means positioned within said chamber for humidifying said air, means positioned within said chamber for filtering said air, a fan rotor assembly positioned within said chamber for drawing said air into said chamber past the foregoing means and exhausting said processed air from said chamber, means positioned within said chamber and above said fan rotor for channeling the flow of said processed air, a plurality of heating elements positioned within said chamber and above said last mentioned means in direct alignment with the flow of air being forced from said fan rotor, temperature responsive means connected to the plurality of heating elements for controlling their operation, moisture responsive means connected to the preheating means and humidifying means for controlling their operation and means for interdependently controlling the actuation and speed of the fan rotor, the position of the means for controlling the air flow beyond the fan rotor and the energization of the heating elements.

6. Apparatus of the class described, in combination, a casing, a chamber positioned within and spaced from said casing, said chamber being formed to received unprocessed air from a number of sources and to exhaust processed air to a number of locations, means positioned within said chamber for preheating said air, means positioned within said chamber for humidifying said air, means positioned within said chamber for filtering said air, a fan rotor assembly positioned within said chamber for drawing said air into said chamber past the foregoing means and exhausting said processed air from said chamber, a plurality of heating elements positioned within said chamber in direct alignment with the flow of air being forced from said fan rotor, temperature responsive means connected to the plurality of heating elements for controlling their operation, moisture responsive means connected to the preheating means and humidifying means for controlling their operation and means for interdependently controlling the actuation and speed of the fan rotor and the energization of the heating elements.

7. Apparatus of the class described, in combination, a casing, a chamber positioned within and spaced from said casing, said chamber being formed to receive unprocessed air from a number of sources and to exhaust processed air to a number of locations, means positioned within said chamber for preheating said air, means positioned within said chamber for humidifying said air, means positioned within said chamber for filtering said air, a fan rotor assembly positioned within said chamber for drawing said air into said chamber past the foregoing means and exhausting said processed air from said chamber, a plurality of heating elements positioned within said chamber in direct alignment with the flow of air being forced from said fan rotor, temperature responsive means connected to the plurality of heating elements for controlling their operation, and moisture responsive means connected to the preheating means and humidifying means for controlling their operation.

8. Apparatus of the class described, in combination, a casing, a chamber positioned within and spaced from said casing, said chamber being formed to receive unprocessed air from a number of sources and to exhaust processed air to a number of locations, means positioned within said chamber for humidifying said air, means positioned within said chamber for filtering said air, a fan rotor assembly positioned within said chamber for drawing said air into said chamber past the foregoing means and exhausting said processed air from said chamber, a plurality of heating elements positioned within said chamber in direct alignment with the flow of air being forced from said fan rotor, temperature responsive means connected to the plurality of heating elements for controlling their operation, moisture responsive means connected to the humidifying means for controlling its operation and means for interdependently controlling the actuation and speed of the fan rotor and the energization of the heating elements.

9. Apparatus of the class described, in combination, a casing, a chamber positioned within and spaced from said casing, said chamber being formed to receive unprocessed air from a number of sources and to exhaust processed air to a number of locations, means positioned within said chamber for humidifying said air, means positioned within said chamber for filtering said air, a fan rotor assembly positioned within said chamber for drawing said air into said chamber past the foregoing means and exhausting said processed air from said chamber, a plurality of heating elements positioned within said chamber in direct alignment with the flow of air being forced from said fan rotor, temperature responsive means connected to the plurality of heating elements for controlling their operation and moisture responsive means connected to humidifying means for controlling its operation.

10. Apparatus of the class described, in combination, a casing, a chamber positioned within and spaced from said casing, said chamber being formed to receive unprocessed air from a number of sources and to exhaust processed air to a number of locations, means positioned within said chamber for humidifying said air, means positioned within said chamber for filtering said air, a fan rotor assembly positioned within said chamber for drawing said air into said chamber past the foregoing means and exhausting said processed air from said chamber, a plurality of heating elements positioned within said chamber in direct alignment with the flow of air being forced from said fan rotor, and means for interdependently controlling the actuation and speed of the fan motor and the energization of the heating elements.

11. Apparatus of the class described, in combination, a casing, a chamber positioned within and spaced from said casing, a plurality of air intakes and an air outlet formed within said chamber, a preheating element positioned within said chamber, means for controlling the energization of said preheating element, a water vaporizing device positioned within said chamber, means associated therewith for preheating the water, a magnetically operated valve associated with said water vaporizing device, hygrostatic means connected therewith for actuating said magnet, a filter removably positioned below the vaporizing device, a fan rotor positioned within said chamber in direct alignment with said filter, means for actuating said fan rotor, means for dampening the vibrations within said chamber, a plurality of dampers positioned directly above said vibration dampening means, means for controlling the position of said dampers, a plurality of heating elements positioned above said dampers, means for controlling the successive energization of said heating elements, and temperature responsive means for controlling the last mentioned means.

12. Apparatus characterized as in claim 11 wherein means for successively energizing the heating elements comprises, a modulated control mechanism having therein a plurality of cams, a plurality of switches controlled by the position of said cams and means for determining the position of said cams in relation to said switches.

13. Apparatus of the class described, in combination, a casing, a chamber positioned within and spaced from said casing, a plurality of air intakes and an air outlet formed within said chamber, a preheating element positioned within said chamber, means for controlling the energization of said preheating element, a water vaporizing device positioned within said chamber, a magnetically operated valve associated with said water vaporizing device, hygrostatic means connected therewith for actuating said magnet, a filter removably positioned below the vaporizing device, a fan rotor positioned within said chamber in direct alignment with said filter, means for actuating said fan rotor, a plurality of dampers positioned directly above said fan rotor, means for controlling the position of said dampers, a plurality of heating elements positioned above said dampers, means for controlling the successive energization of said heating elements, and temperature responsive means for controlling the last mentioned means.

14. Apparatus of the class described comprising, an outer casing, a U-shaped chamber positioned within and spaced from the walls of said casing, a plurality of air intakes formed at the top of one leg of the U-shaped chamber, a hot air outlet formed at the top of the other leg of the U-shaped chamber, a plurality of mechanically operated dampers positioned within the air intakes and adapted for channeling the passage of air through said intakes, a fan rotor rotatably positioned within the base of the U-shaped chamber, means for actuating and controlling the speed of said fan rotor, a plurality of dampers positioned above the fan rotor and within one leg of said U-shaped chamber, means for controlling the position of said dampers with relation to the interior of said chamber, a plurality of heating elements positioned below the hot air outlet and within the chamber, and means for successively energizing said elements, said means for actuating the dampers, the fan rotor and successively energizing the heating elements, all being interrelated with each other and jointly actuated to provide a uniform flow of conditioned air through said chamber.

15. Apparatus characterized as in claim 14 wherein the means for controlling the speed of the fan rotor comprises, a rheostat, a modulated control mechanism and a link joining said rheostat to said modulated control mechanism whereby the operation of the control mechanism determines the resistance of the rheostat.

16. Apparatus characterized as in claim 14 wherein the means for controlling the position of the dampers with relation to the interior of said chamber comprises a crank arm, a pair of links joined to said crank arm and said dampers, a modulated control mechanism, and a link directly secured to said mechanism and indirectly secured to said crank arm whereby the actuation of the modulated control mechanism is transmitted to the crank arm.

GEORGE L. MENDENHALL.
ADAM C. MOORE.
JAMES A. MENDENHALL.

REFERENCES CITED

The following references are of record in the file of this patent:

UNITED STATES PATENTS

| Number | Name | Date |
|---|---|---|
| 899,289 | Braemer | Sept. 22, 1908 |
| 1,059,976 | Carrier | Apr. 29, 1913 |
| 1,134,976 | Braemer | Apr. 6, 1915 |
| 1,949,735 | Bulkeley | Mar. 6, 1934 |